June 7, 1966   G. F. WICHMANN ETAL   3,254,737
VEHICLE POWER STEERING SYSTEM
Filed July 19, 1962
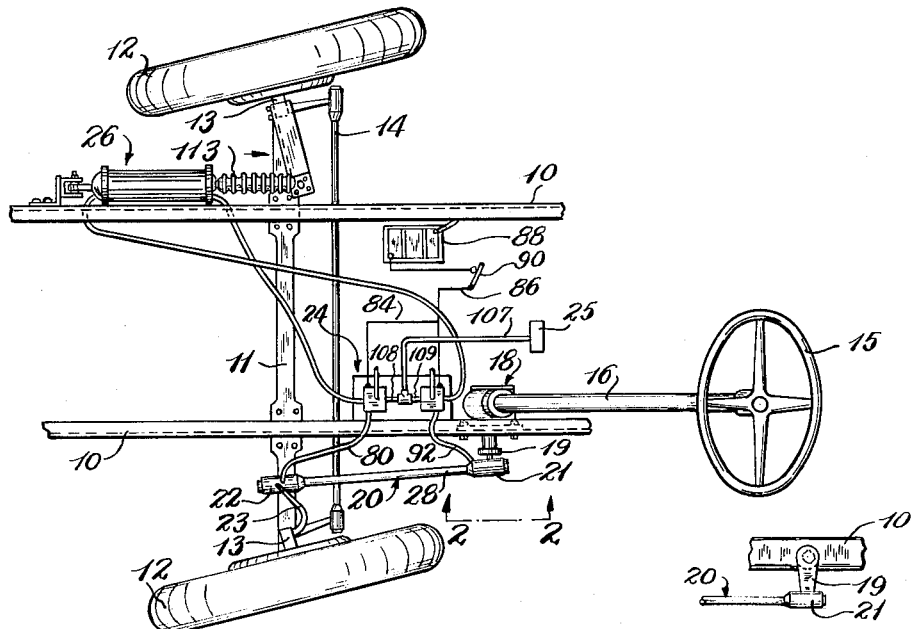
FIG.1
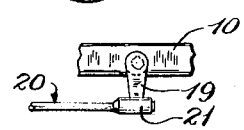
FIG.2
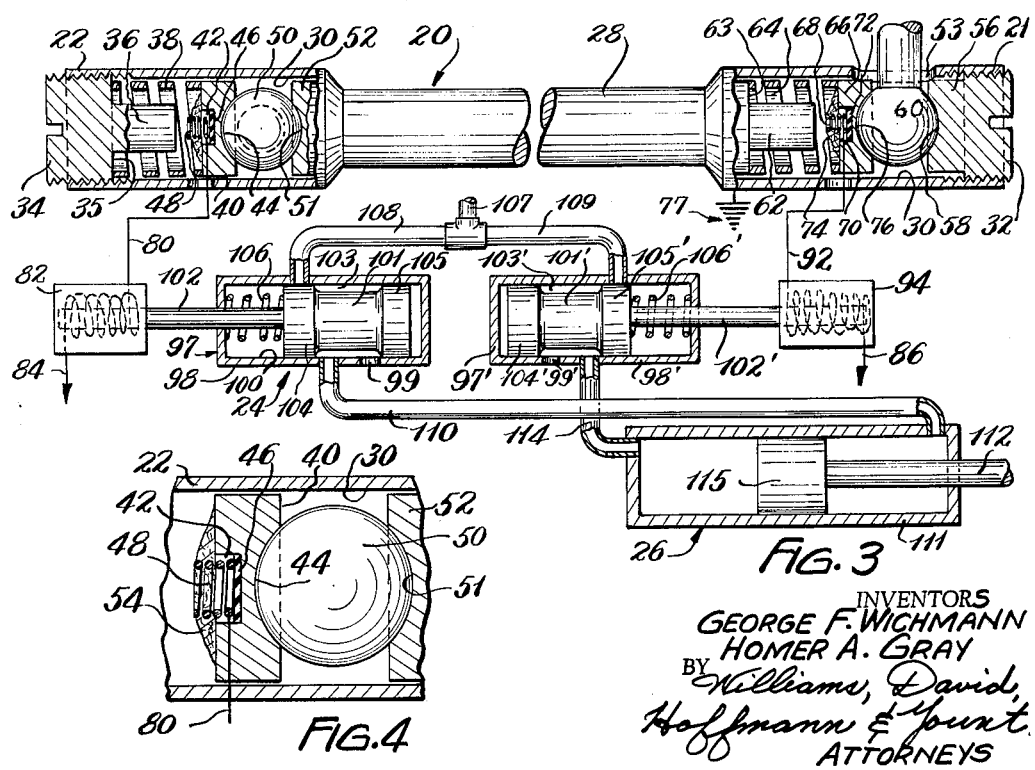
FIG.3
FIG.4
INVENTORS
GEORGE F. WICHMANN
HOMER A. GRAY
BY Williams, David,
Hoffmann & Yount
ATTORNEYS

United States Patent Office 3,254,737
Patented June 7, 1966

3,254,737
VEHICLE POWER STEERING SYSTEM
George F. Wichmann, Shaker Heights, and Homer A. Gray, Macedonia, Ohio, assignors of one-half to Apsco Manufacturing Corporation and one-half to Air-O-Matic Power Steer Corporation, Cleveland, Ohio, both corporations of Ohio
Filed July 19, 1962, Ser. No. 210,980
6 Claims. (Cl. 180—79.2)

This invention relates to vehicle steering systems and is particularly directed to a power steering system including electrical means for controlling a motor to provide a power assist in turning the vehicle wheels.

The principal object of the invention is to provide a pair of ball and socket joints in a drag link assembly, each ball and socket joint comprising a ball engaged on either side by ball cups, one of which is arranged to complete an electrical connection with the electrically grounded frame of the drag link assembly when brought into contact with a portion of the drag link assembly by relative movement therebetween to electrically activate a valve for controlling a pressure responsive motor to turn the wheels of a vehicle in a predetermined direction.

Another object of the present invention is to provide a new and improved drag link assembly structure which enables a manual type of steering system to be readily converted to a power assisted system.

Other objects inherent in the nature and structure of the invention will become apparent to those skilled in the art from the following description taken in conjunction with the accompanying drawings in which:

FIG. 1 is a plan view of a portion of a vehicle embodying the present invention;

FIG. 2 is a view of the pitman arm connection taken along line 2—2 of FIG. 1;

FIG. 3 is an enlarged elevational view of the drag link assembly of the present invention and the electrically activated valve means with parts shown in section and with parts broken away; and FIG. 4 is a fragmentary enlargement of the ball and socket joint at the left hand end of FIG. 3 of the present invention.

While the present invention is susceptible of various modifications and constructions it is employed with particular advantage in heavy-duty vehicles which operate over rough terrain and have wheels rotatable about vertical axes, the turning of which is controlled by an operator-controlled steering wheel.

Referring to FIG. 1 of the drawings, a portion of the vehicle embodying the steering system of the present invention is illustrated. The vehicle may constitute a conventional passenger car, bus, truck, earth moving machine, etc., and includes a frame 10 supporting an axle 11, the axle extending between a pair of front dirigible wheels 12. The wheels are mounted for movement as a unit about vertical axes by means of conventional knuckles 13 carried by the axle 11, the knuckles being tied together by a tie rod 14 extending parallel to the axle 11.

The vehicle includes a manually rotatable or operator-controlled steering wheel 15 attached to a steering post 16, the post operating through a gear system 18 to effect pivotal movement of a pitman arm 19. Since the gear system 18 may be of conventional construction, it need not be described except to say that rotation of the steering wheel 15 in either direction imparts a corresponding movement to the pitman arm 19 in either direction about a horizontal axis as viewed in FIG. 2.

The pitman arm 19 is operatively connected to a drag link assembly 20 forming part of the present invention and which will be described in detail hereinafter. More specifically, the pitman arm 19 is connected to one end of the drag link assembly 20 while the other end 22 of the assembly is operatively connected to one of the knuckles 13 through a steering arm 23.

In the preferred embodiment the drag link assembly 20 is arranged to initiate the electrical activation of a valve means or assembly 24 in response to rotation of the steering wheel 15, the valve means or assembly controlling the application of pressure, such as air, from a pressure source 25 to a motor 26 for turning the wheels 12. The source 25 may include a pump driven from the vehicle engine to supply air under pressure to the valve means 24.

In the present invention the drag link assembly 20 is provided with a pair of ball and socket joints, each ball and socket joint comprising a ball engaged on one side by a ball cup or pad of conventional design and on the other side by a specially designed movable ball cup or pad. The movable ball cup of the ball and socket joint is adapted to complete an electrical connection with the electrically grounded frame 10 of the drag link assembly 20 when brought into contact with a portion of the drag link assembly by relative movement therebetween, thereby initiating an electrically activatable valve for controlling a pressure responsive motor to turn the vehicle wheels 12 in a predetermined direction.

Basically, the drag link assembly 20 is an elongated cylindrical rod or body member 28 connecting opposed, enlarged tubular end sections 21, 22. Each end section is hollow and has a longitudinal bore 30, the opened end of each bore being plugged by a longitudinally adjustable cap member 32, 34, and the cap members are exteriorly threaded for interiorly threaded engagement within the tubular end sections.

The cap member or plug 34 at the left end of the elongated body member 28 as viewed in FIG. 3, has at its inner end an annular shoulder 35 and a reduced rod-like extension 36 projecting from the center of the annular shoulder, the rod-like extension being formed of electroconductive material. The annular shoulder forms an abutment seat for the outer end of a helical spring 38 which surrounds the projecting extension in a radially spaced relation thereto. The inner or opposite end of the helical spring abuts the surface of the movable ball cup 40 and urges the ball cup away from the projecting extension for a purpose which will become evident later.

Each movable ball cup such as 40, is formed of a material structurally capable of receiving and transmitting applied pressures on one side from the helical spring, or the rod-like projecting extension under manual conditions (to be explained later), and on the other side from the ball. The ball cup 40 is substantially a disk in configuration, being flat on one side and provided with a centrally disposed recess 42, and being provided on the other side with a concave recess 44 adapted to partially receive and fit about a portion of the ball. An insulating layer 46 of suitable material is secured to the bottom of the centrally disposed recess 42 and an electrically conducting spring 48, preferably helical, is in turn secured to the insulating layer 46 and projects outwardly from the face of the ball cup 40.

The ball 50 is operatively connected to the vehicle wheels 12 by way of the steering arm 23 which projects through an opening (not shown) in the tubular section 22. The operation and purpose of the ball will be described later.

The opposite side of the ball is similarly received within a concave recess 51 in a fixed ball cup 52 at the inner end of the tubular section 22.

An insulating composition 54 is employed to completely fill in the recess 42 and about the electrically conducting spring 48 and to extend beyond the face of the ball sufficiently to cover all of the electrically conducting spring 48 except its outermost contact end. The composition is plastic or rubber-like and may be made from any suitable material capable of resiliency greater than that of the spring 48 so that it may permit the electrically conducting spring to be compressed and to readily expand when necessary. The use of such composition prevents moisture of any nature from condensing or coming within contact in the recess or adjacent thereto with the electrically conducting spring and thereby shorting it out, a shortcoming to which many conventional mechanical switches are subject.

The details and character of the opposite tubular section 21 is nearly the same as that described above, with the exception that the cap member or plug 32 is provided with a ball cup 56 having a concaved recess 58 for receiving one side of a ball 60 in a manner similar to the fixed ball cup 52 of the opposite tubular section 22; the ball being connected to the pitman arm 19 which extends through an elongated opening 53 of the end 21; and the corresponding rod-like projecting extension 62 is formed on the inner end of the tubular section 21 integral with the body member 28 and having a helical spring 64 correspondingly abutting the annular shoulder 63 formed about the base of the rod-like projecting extension and surrounding the latter in radially spaced relation thereto. The ball cup 66 with its electrically conducting spring 68 secured to the insulating layer 70 within the centrally disposed recess 72, the latter recess and spring 68 being surrounded by the insulating composition 74, is urged by the helical spring 64 against the ball 60, the latter being partially received within the concave recess 76 formed on the one side of the ball cup 66.

The balls 50, 60 have a normal relative position providing a predetermined spacing between the balls. The cap members 32, 34 are adjustable longitudinally of the bores by rotation thereof to permit variation of the spacing between each novel ball cup and projecting extension.

The drag link assembly 20 and its movable ball cups 40, 66 described above are electrically connected to initiate activation of a valve assembly 24 controlling a motor 26, the motor serving to turn the vehicle wheels 12 in a predetermined direction. The body member 28 of the drank link assembly is electrically grounded as indicated at 77 in FIG. 3, to the frame 10 of the vehicle, and each projecting extension 36, 62, as heretofore described, is connected to the body member and is made of a suitable electrically conductive material. The one movable ball cup 40 is connected by a wire 80 to one terminal of the solenoid 82. The other terminal of the solenoid is connected to a wire 84, the latter leading to a wire 86 connected to one terminal of the battery 88 through a switch 90.

The other movable ball cup 66 is connected by a wire 92 to one terminal of the solenoid 94, and the other terminal of the solenoid is connected to wire 86, as heretofore set forth. A portion of wire 86 is in parallel with the wire 84.

Each solenoid is operably connected to a valve of the valve assembly by a stem formed of magnetic material. The valve 97 includes a housing 98 having an atmospheric vent 99 and a longitudinal bore 100 in which valve body 101 is slidably mounted. The slidable valve body 101 is operably connected to the solenoid 82 by the stem 102. The valve body has an intermediate restricted portion 103 forming an annular groove. The portion 103 is intermediate a pair of flange-like lands 104, 105. The valve body 101 is normally urged toward the right-hand end of the housing by means of a helical spring 106 engaging the axial outer end surface of the land 104 and the inner surface of an end wall of the housing 98.

The valve assembly 24 is supplied with a pressurized fluid, such as air, by a source 25 through a conduit 107 leading to conduit sections 108, 109. The conduit sections and conduit are connected to the valve housings to communicate with the longitudinal bores therein. As illustrated in FIG. 3 the valve body 101 is in its normal position when solenoid 82 is de-energized. In this position of the valve body 101 the land 104 closes the end of the conduit section 108 thereby preventing the flow of pressure from the conduit section 108 to the conduit 110. The conduit 110 communicates through groove 103 with vent 99 so as to allow venting of pressure from cylinder 111 of the piston-cylinder motor 26.

When solenoid 82 is energized the valve body 101 is moved toward the left against the action of spring 106 to a position wherein the land 104 opens the end of the conduit section 108 and the land 105 closes the vent 99. In this position of the valve body 101 pressure is now permitted to flow from the conduit section 108 through the annular groove 103 into the conduit 110 to the right-hand end of the cylinder 111 of the piston-cylinder motor 26. Corresponding parts of the valves 97 and 97' are represented by the same reference numerals with the numerals for parts of the valve 97' having prime designations associated therewith.

The valves 97, 97' control the flow of pressure to the desired end of the piston-cylinder motor 26 through a conduit 110 as heretofore described, and conduit 114 which is connected to housing 98' in like manner as conduit 110 is connected to housing 98. The motor has a piston assembly slidable within the cylinder 111 and includes a piston rod 112 having an outer end pivotally connected to a link 113, the link being secured to one of the knuckles 13. The cylinder 111 is pivotally connected at its end opposite the projecting rod 112 to a portion of the frame 10 for movement about a horizontal axis. The operation of the steering system may now be described.

Let it be assumed initially that the wheels 12 of the vehicle and steering wheel 15 are in straight-ahead positions and that the various parts of the system are in their positions illustrated in FIG. 3. As the vehicle operator desires to make a left turn, he rotates the wheel 15 in a counterclockwise direction from its normal position wherein the wheels 12 are straight ahead. Such rotation of the wheel 15 effects movement of the pitman arm 19 and the ball 60 attached thereto toward the left away from fixed ball cup 56 as viewed in FIG. 4. Initially, the body member 28 is restricted against movement toward the left by the ball 50 because the wheels 12 provide a resisting force against movement due to the friction between the wheels and the ground and due to the force necessary to break the piston of the motor 26 from the cylinder 111. Consequently, the body member 28 is restricted against movement and thus the steering wheel connected ball 60 and its ball cup 66 move relative to the body member causing the helical spring 64 to yield until the electrically conducting spring 68 contacts the projecting extension 62. When this occurs, an electrical circuit is completed for activating the valve 97' and this circuit may be traced from one terminal of the battery 88 through the switch 90, the wire 86, the solenoid 94, the wire 92, the electrically conducting spring 68, the electrically conductive projecting extension 62 and back to the grounded terminal of the battery 88 through the frame 10 to which the body member 28 is electrically grounded.

When the above-described electrical circuit is completed the solenoid 94 is energized and the valve body 101' of the valve 97' is moved to the right whereby air under pressure from the source 25 flows through the conduit 107, the conduit section 109, the annular groove 103' and the conduit 114 to the left-hand end of the cylinder 111. The air pressure engages the piston 115 to move the piston rod 112 toward the right to provide a power assist for turning the vehicle wheels 12 in a counterclockwise direction. Air in the right-hand end of the cylinder 111 is exhausted at this time through the conduit 110 and the vent 99. A needle-type valve or other flow resistor (not shown) is preferably disposed in the conduit 107 to restrict the flow of air pressure to the valves 97, 97'.

When the wheels 12 are moved counterclockwise by the operation of the motor 26, the vehicle wheel connected ball 50 is moved to the left as viewed in FIG. 3, and this movement will permit the spring 64 to expand since the spring 64 will tend to maintain abutment of the integral ball cup 52 against the ball 50. Consequently, inasmuch as the spring 64 is strong enough to expand against the shoulder of the projecting extension 62, once the vehicle wheel connected ball no longer obstructs movement of the body member to the left, the body member is caused to move to the left until the ball cup 56 is once more in engagement with the steering wheel connected ball. Thus the expansion of the spring 64 will separate the electrically conducting spring 68 from the projecting extension 62 unless the ball is simultaneously being moved with the movement of the wheels 12 to the left at a rate which maintains the spring 64 compressed and the electrically conducting spring 68 in engagement with the projecting extension 62. When the operator stops turning the steering wheel 15 in a counterclockwise direction, the ball 60 will stop moving to the left, and when the wheels have been turned sufficiently far by the motor 26 to move the ball 50 to a point where the expansion of the spring 64 separates the electrically conducting spring 68 from the projecting extension 62, the power assist will be stopped due to the de-energization of the solenoid 94 and the shifting of the valve body 101′ to a position where the conduit 114 to the motor 26 is connected to the exhaust via vent 99′. As long as the wheels 12 remain in the positions corresponding to the position to which the steering wheel has been turned, the solenoid activated valves 97, 97′, are de-energized.

If the wheels 12 should tend to straighten without a corresponding clockwise turning of the steering wheel 15, the ball 50 will be moved to the right, as viewed in FIG. 3, by the straightening movement of the wheels 12 and since the ball 60 is being held in position by the operator, the spring 64 will compress and the projecting extension 62 will engage the electrically conducting spring 68 to provide a power assist to maintain the wheels in their position corresponding to the position of the steering wheel 15. If, on the other hand, some force is applied to the wheels which tends to turn the wheels farther in a counterclockwise direction than that corresponding to the position of the steering wheels, the ball 50 will move to the left. Consequently, the body member 28 will be held against movement to the left by the ball 60 engaging the fixed ball cup 56 of the body member, thus the spring 38 will be compressed. Therefore, the vehicle wheel connected ball will move its ball cup 66 and its electrically conducting spring 68 toward engagement with the projecting extension 62. When the electrically conducting spring 68 engages the projecting extension 62, the solenoid 94 will be energized to affect operation of the motor 26 in the opposite direction to return the wheels to the position corresponding to the position of the steering wheel. Therefore, when the motor 26 moves the vehicle wheels 12, the vehicle wheels in turn move the ball 50 to the right as viewed in FIG. 3 and since its ball cup 40 is biased thereagainst, the latter will move with the ball thereby breaking electrical contact between the electrically conducting spring 48 of the electrical projecting extension.

When the wheels 12 are to be returned to their straightline position, the steering wheel 15 is rotated clockwise to its position corresponding to the straight-line position of the wheels. Normally, the force upon the wheels due to the load will cause the wheels 12 to follow the steering wheel 15 through movement of the body member without engagement of the electrically conducting springs and projecting extensions, but if the wheels should tend to run ahead or resist a certain movement with a force sufficient to compress either the spring 38 or the spring 68, the proper corresponding electrically conducting spring and projecting extension will be engaged to provide a power assist and return the wheels at the same rate that the steering wheel is being returned.

If it is desired to make a right turn, the wheel 15 is rotated in a clockwise direction which causes the pitman arm 19 and the ball 60 to move to the right. If the wheels 12 do not follow the steering wheel 15, the force applied by the ball 60 against the fixed ball cup 56 of the body member will cause the spring 38 to compress and the body member will move to the right. The ball cup 40 and its electrically conducting spring 48 are restrained at this time by the ball 50 if it has not followed the ball 60. When the projecting extension 36 contacts the electrically conducting spring 48 the electrical circuit is completed to solenoid 82. The electrically conducting spring 68 and projecting extension 62 do not engage at this time since they are both moving to the right following the ball 60 and the spring 64 is sufficiently stiff to maintain the spacing therebetween during such movement.

Energization of solenoid 82 affects movement of the valve body of the valve 97 toward the left. When the land 104 has opened the end of the conduit section 108 air under pressure flows from the source 25 through the conduit 107, the conduit section 108, the annular groove 103 and the conduit 110 to the right-hand end of the cylinder 111. This forces the piston rod 112 toward the left to effect turning of the wheels in a clockwise direction which moves the ball 50 toward the right thereby taking up the space between the ball 50 and the ball cup 52. When the piston rod is moved toward the left, air in the left-hand end of the cylinder 111 is forced through the conduit 114, the annular groove 103′ and the vent 99′.

When clockwise rotation of wheel 15 is stopped, spring 38 will be expanded to separate the electrically conducting spring 48 and projecting extension 36 and thereby de-energize solenoid 82 to terminate the flow of air pressure to cylinder 111 when the ball 50 has been moved to its neutral position relative to the ball 60. Clockwise turning of vehicle wheels 12 is thereby stopped and the wheels 12 and the electrically conducting spring and projecting extension will operate in a manner similar to that described in connection with turning to the left to maintain the wheels in a position corresponding to the steering wheel position. When the steering wheel is returned the wheels will follow with or without power assist in a manner similar to that described in the description of the turn to the left. If return movement of the wheels 12 is resisted for any reason, counterclockwise rotation of steering wheel 15 toward its normal position results in engagement of electrically conducting spring 68 and projecting extension 62 to activate valve 97′ which operates motor 26 for forcibly returning the vehicle wheels 12. Since the electrically conducting springs 48, 68 are of resilient construction the possibility of damage thereto which may result from repeated engagement with the projecting extensions 36 and 62 is minimized.

In the present invention the steering system may be readily converted from power operation to manual operation. This conversion is effected by the simple expedient of operating the switch 90, which may be positioned for actuation by the vehicle operator, to disconnect the valve control electrical circuits from the battery 88. The turning operation is then effected directly by movement of the body member 28 in response to turning of the steering wheel 15. When the switch 90 is open and the steering wheel 15 is turned in a clockwise direction, the ball 60 moves to the right and thereby effects movement of the body member 28 and the projecting extension 36 toward the right. The projecting extension 36 compresses spring 38 and electrically conducting spring 48 and urges the ball cup 40 and the ball 50 to the right which causes clockwise rotation of the wheels 12. When the steering wheel 15 is turned in the counterclockwise direction, the ball 60 urges the ball cup 66 toward the left to compress spring 64 and when the electrically conducting spring 68 engages the projecting extension and is compressed, the body member 28 is moved toward the left. This operates to move the ball 50 and the steering arm 23 to the left to turn the wheels 12 in counterclockwise direction. The engagement of the several electrically conducting springs and projecting extensions has no effect inasmuch as the switch 90 is opened and the valve controlling electrical circuits cannot be energized.

The steering system of the present invention is of very inexpensive flexible construction. Clearly, it will be seen that the drag link assembly could be supplied for manual operating with ball cups corresponding to ball cups or pads 40 and 66 but which do not have the electrically conducting springs; and if it were later desirable to convert the system to a power assisted one, the original cups need only be replaced by the disclosed cups with the electrically conducting springs. Moreover, by utilizing a drag link assembly having relatively movable electrically conducting springs and projecting extensions for controlling electrically activatable valve means, the valve means or assembly may be located so that the possibility of damage thereto during operation of the vehicle is minimized. This is of particular advantage in vehicles which operate over rough terrain.

Although the invention has been described with reference to certain specific embodiments thereof, numerous modifications are possible and it is desired to cover all modifications falling within the spirit and scope of the appended claims.

Having thus described our invention, we claim:

1. In a drag link assembly operatively connected at one end to a manually operable steering wheel, at its other end to vehicle wheels, and electrically connected to power means for providing an assist for turning the vehicle wheels, means for initiating electrical activation of the power means comprising: an electrically conductive projecting extension fixed at each end of the drag link assembly forming an electrical ground to one side of said power means; an electrically conducting part at each end of said drag link assembly movable with respect thereto and spaced electrically from said projecting extensions, each of said parts forming an electrical connection to the other side of said power means and each part being urged away from an adjacent one of said projecting extensions; and means responsive to rotation of the steering wheel in one direction for moving one of said projecting extensions into electrical engagement with one of said electrically conducting parts to activate said power means for turning the wheels in one direction, said responsive means including a portion responsive to rotation of said steering wheel in an opposite direction for moving one of said electrically conducting parts into electrical engagement with one of said projecting extensions to actuate said power means for turning the vehicle wheels in an opposite direction.

2. In a drag link assembly operatively connected at one end to a manually operable steering wheel, at its other end to vehicle wheels, and electrically connected to power means for providing an assist for turning the vehicle wheels, means for initiating electrical activation of the power means comprising: an electrically conductive projecting extension fixed at each end of the drag link assembly forming an electrical ground to one side of said power means; an electrically conducting part relatively movable with respect to the drag link assembly at each end thereof electrically spaced from said projecting extensions and forming an electrical connection to the other side of said power means and each of said parts being urged away from an adjacent one of said projecting extensions; a first means responsive to rotation of said steering wheel in one direction for moving one of said projecting extensions into electrical engagement with one of said electrically conducting parts to activate said power means for turning the vehicle wheels in one direction, said first means including a portion responsive to rotation of said steering wheel in an opposite direction for moving one of said electrically conducting parts into electrical engagement with one of said projecting extensions to activate said power means for turning the wheels in an opposite direction; and second means movable in response to turning of said vehicle wheels in either of said directions for electrically disengaging said projecting extension from said electrically conducting part to de-activate said power means.

3. A drag link assembly operatively connected at one end to a manually operable steering wheel, at its other end to vehicle wheels, and electrically connected to power means for providing an assist for turning the vehicle wheels, comprising: an elongated body member forming an electrical ground to one side of said power means; an electrically conductive projecting extension fixed adjacent each end of said body member; a ball and socket joint at each end of said body member, one ball forming part of the operable connection to the steering wheel, and the other ball forming part of the operable connection to the vehicle wheels, each of said socket joints comprising ball cups disposed on opposite sides of the ball and having recesses therein adapted to receive the ball, one ball cup being fixed with respect to the body member, and the other ball cup being spring-urged against said ball and away from an adjacent one of said projecting extensions and having a resilient spring member projecting from its face between the ball cup and the adjacent projecting extension, an insulating pad insulating said resilient member from said other cup of the joint, said spring member forming an electrical connection to the other side of said power means; said one ball initially operable by and when the steering wheel is rotated in one direction to cause the projecting extension at the vehicle wheel connected end of the drag link assembly to be moved into electrical contact with the resilient projecting member of the adjacent ball cup whereby said power means is activated, subsequently causing the vehicle wheels and said other ball to move in one direction, thus breaking the electrical contact between the projecting extension and the resilient projecting member; and said one ball initially operable by and when the steering wheel is rotated in the other direction to move the resiliently projecting member of the ball cup at the steering wheel connected end of the drag link assembly into electrical contact with the adjacent projecting extension whereby said power means is activated, subsequently causing the vehicle wheels and said other ball to move in a second direction thus breaking the electrical contact between the projecting extension and resilient projecting member.

4. A drag link assembly for interconnecting the wheels and steering mechanism of a vehicle, said assembly including a body member having hollow end sections and plugs closing the end sections, each of said hollow end sections having a ball disposed therein and movable in the hollow end section, one of the balls being connected to the wheels for movement therewith and the other being connected to the steering mechanism; said balls each being disposed between a fixed pad connected to said body member and a movable pad; a spring in each hollow end section urging the adjacent movable pad into engagement with the adjacent ball; each of said springs being disposed on the same side of the respective balls whereby one forms a yieldable force-transmitting connection when the balls are relatively moved in one direction and the other forms a yieldable force-transmitting connection when the balls are relatively moved in the other direction; one of said springs abutting an adjacent end plug and the adjacent end plug having a projection extending therefrom inside the spring toward the adjacent movable pad; the other of said springs abutting the inner end of the hollow end section receiving the spring, said last mentioned hollow end section having a projection disposed within the spring and connected to said inner end and extending toward the adjacent movable pad; an electrically conducting means centrally disposed on the side of each movable pad engaged by the adjacent spring and adapted to engage the adjacent projection to make an electrical circuit on a predetermined relative movement of the pad and the projection toward each other; and electrical control means for effecting a power assist in one direction when one electrically conducting means engages its adjacent projection and in the other direction when the other electrically conducting means engages its adjacent projection.

5. In a drag link assembly operatively connected at one end to a manually operable steering wheel and at its other end to vehicle wheels and electrically connected to power means for providing an assist for turning the vehicle wheels, means for initiating an electrical activation of the power means comprising: an electrically conductive projection fixed at each end of said assembly and forming an electrical ground to one side of said power means; an electrically conductive part at each end of said assembly, each part electrically connected to the other side of said power means and spaced electrically from said projections and movable with respect thereto, a first means at one end of the assembly responsive to rotation of said steering wheel in one direction for moving one of said parts at said one end of the assembly into electrical engagement with one of said projections to activate said power means for turning said vehicle wheels in one direction, said first means including a portion responsive to rotation of said steering wheel in an opposite direction for moving one of said projections at an opposite end of said assembly into electrical engagement with the other of said parts to activate said power means for turning said vehicle wheels in an opposite direction and second means at said opposite end of said assembly responsive to turning of said vehicle wheels for electrically disengaging one of said projections from one of said parts to de-activate said power means.

6. A drag link assembly operatively connected at one end to a manually operable steering wheel and at its other end to vehicle wheels and electrically connected to power means for providing an assist for turning the vehicle wheels comprising an elongated body member forming an electrical ground to one side of said power means, an electrically conductive projection fixed at one end of said body member, a ball and socket joint at said one end of said body member, said ball and socket joint comprising ball cups disposed on opposite sides of said ball and having recesses therein for receiving a portion of the ball, one ball cup being fixed with respect to said body member, spring means urging the other ball cup against said ball and away from said projection, one side of said other ball cup having a resilient spring member thereon extending toward said projection and electrically spaced from said projection, a pad for insulating said resilient member from said other ball cup, said spring member being electrically connected to the other side of said power means, and means including said ball responsive to rotation of said steering wheel for moving said projection and said spring member into electrical engagement to activate said power means for turning said vehicle wheels.

References Cited by the Examiner

UNITED STATES PATENTS

| | | | |
|---|---|---|---|
| 2,062,485 | 12/1936 | Turek | 180—79.2 |
| 2,369,547 | 2/1945 | Eaton | 180—79.2 |
| 2,553,940 | 5/1951 | Quartullo | 180—79.2 |
| 2,747,058 | 5/1956 | Ulanet | 200—166 |
| 2,820,872 | 1/1958 | Carr | 180—79.1 X |
| 2,850,602 | 9/1958 | Breese et al. | 200—166 |
| 2,962,108 | 11/1960 | Bidwell | 180—79.2 |
| 2,964,119 | 12/1960 | Gray et al. | 180—79.2 |

KENNETH H. BETTS, *Primary Examiner.*

PHILIP ARNOLD, LEO FRIAGLIA, *Examiners.*

R. M. WOHLFARTH, R. C. PODWIL,
  *Assistant Examiners.*